Figure 1:
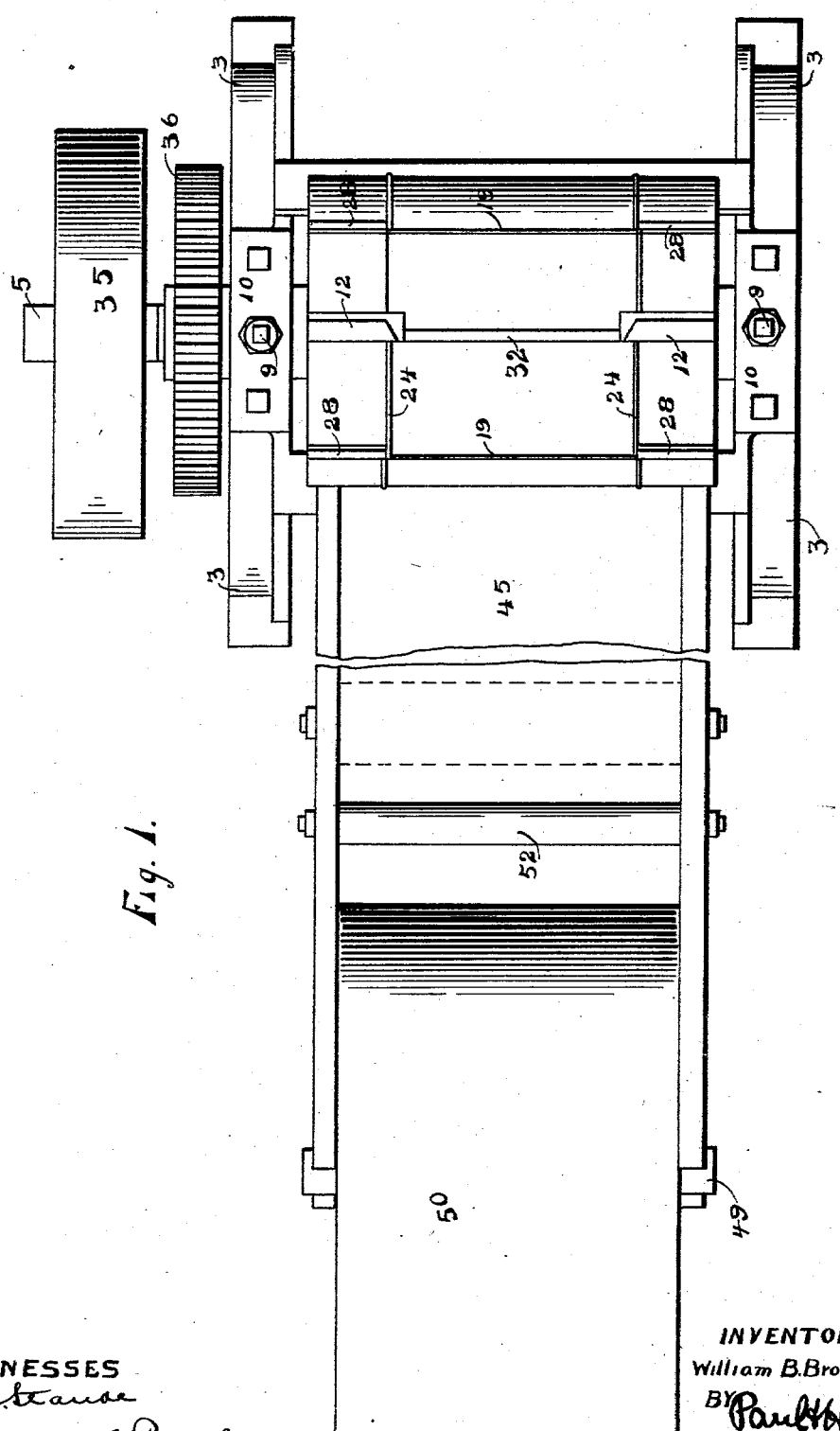

No. 694,725. Patented Mar. 4, 1902.
W. B. BROWNING.
MACHINE FOR CUTTING BLANKS FOR PAPER OR STRAWBOARD BOXES.
(Application filed Apr. 27, 1901.)
(No Model.) 5 Sheets—Sheet 1.

WITNESSES
INVENTOR
William B. Browning.
BY
ATTORNEYS

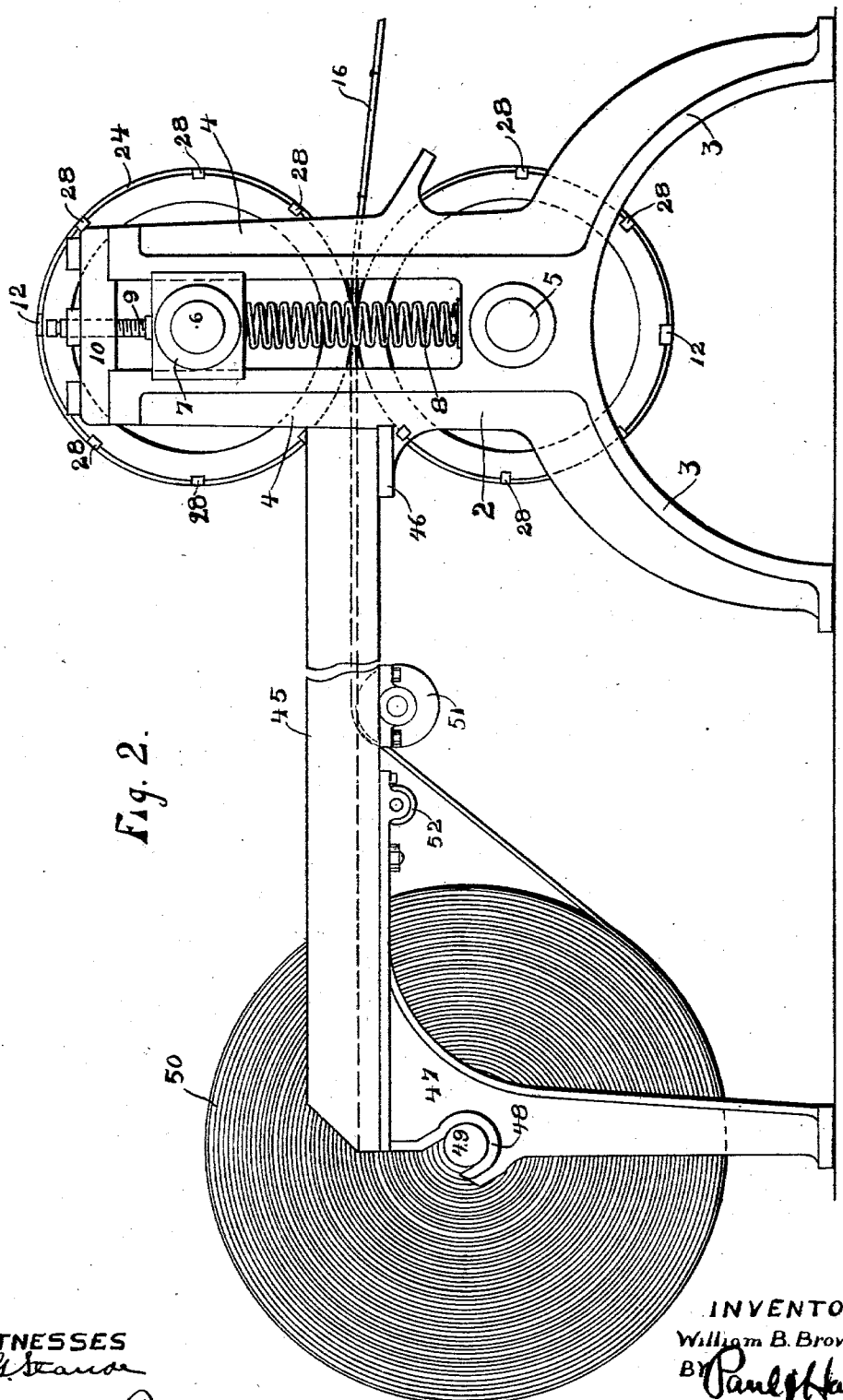

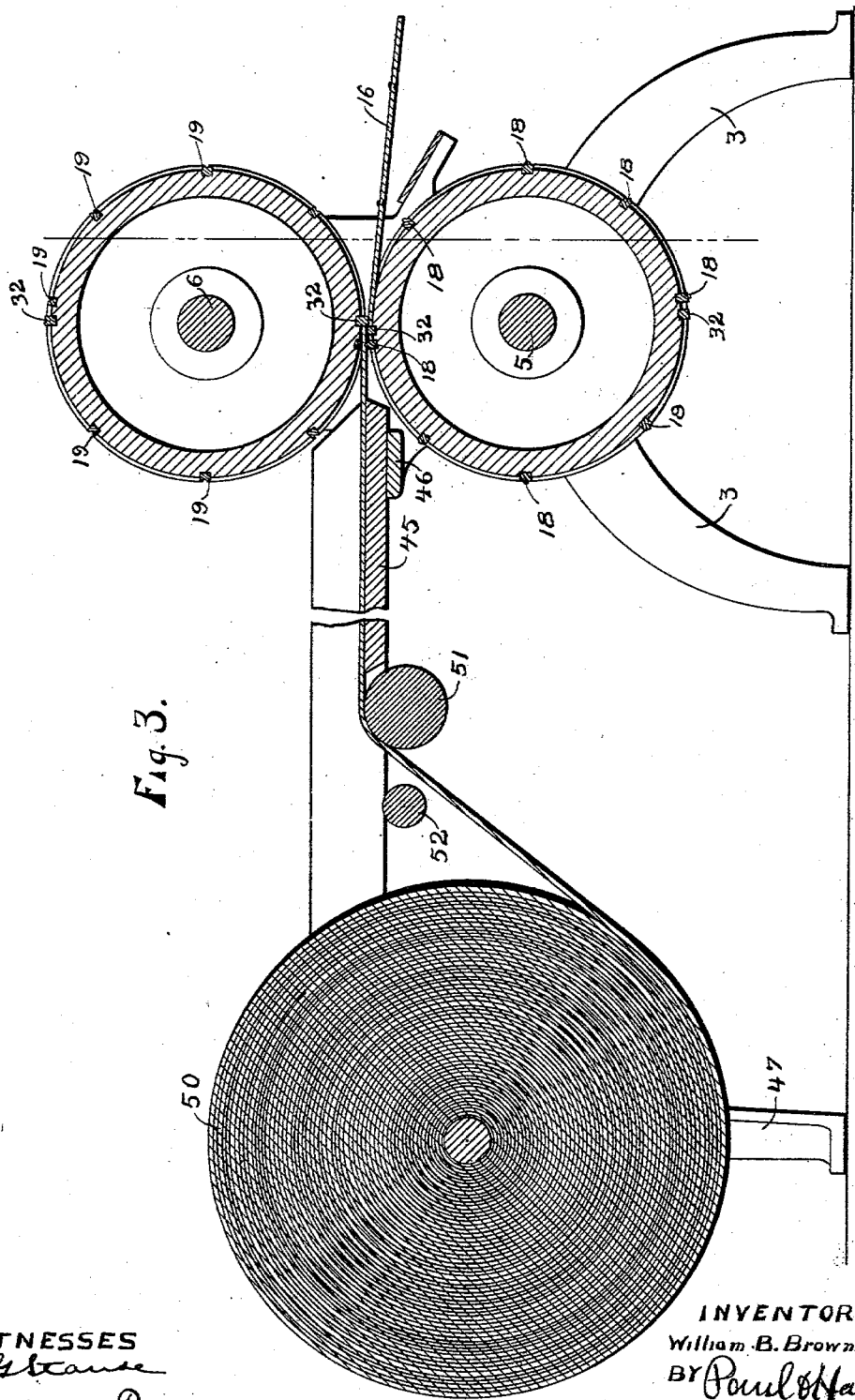

No. 694,725. Patented Mar. 4, 1902.
W. B. BROWNING.
MACHINE FOR CUTTING BLANKS FOR PAPER OR STRAWBOARD BOXES.
(Application filed Apr. 27, 1901.)
(No Model.) 5 Sheets—Sheet 4.
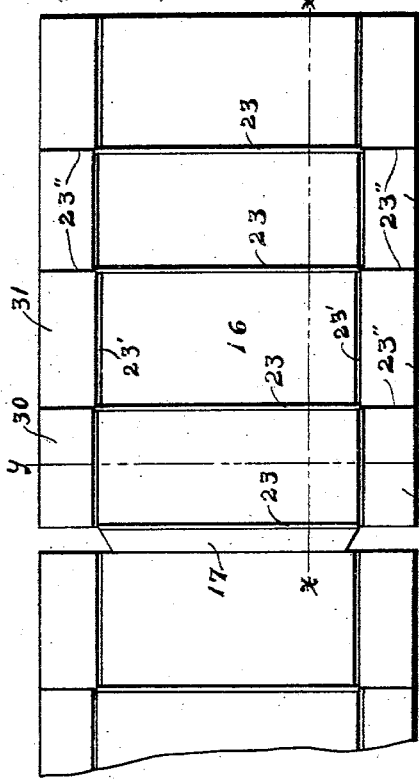
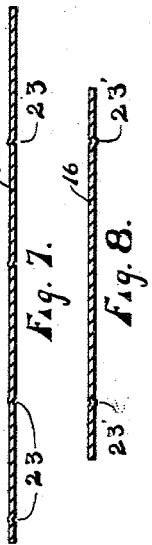
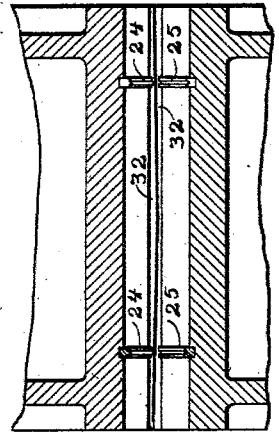
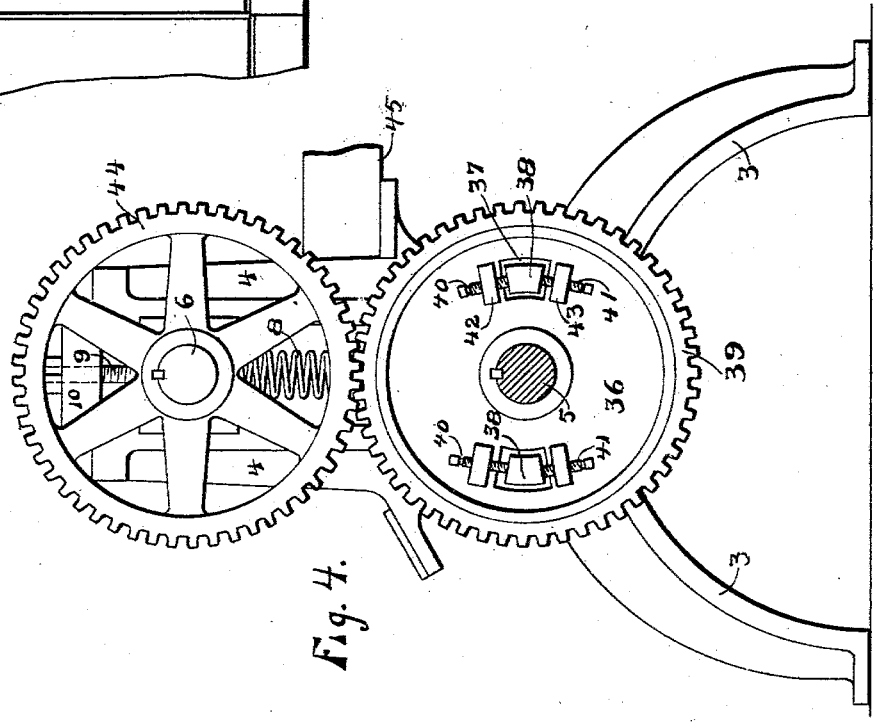
WITNESSES
INVENTOR
William B. Browning
BY Paul & Hawley
ATTORNEYS No. 694,725. Patented Mar. 4, 1902.
W. B. BROWNING.
MACHINE FOR CUTTING BLANKS FOR PAPER OR STRAWBOARD BOXES.
(Application filed Apr. 27, 1901.)
(No Model.) 5 Sheets—Sheet 5.
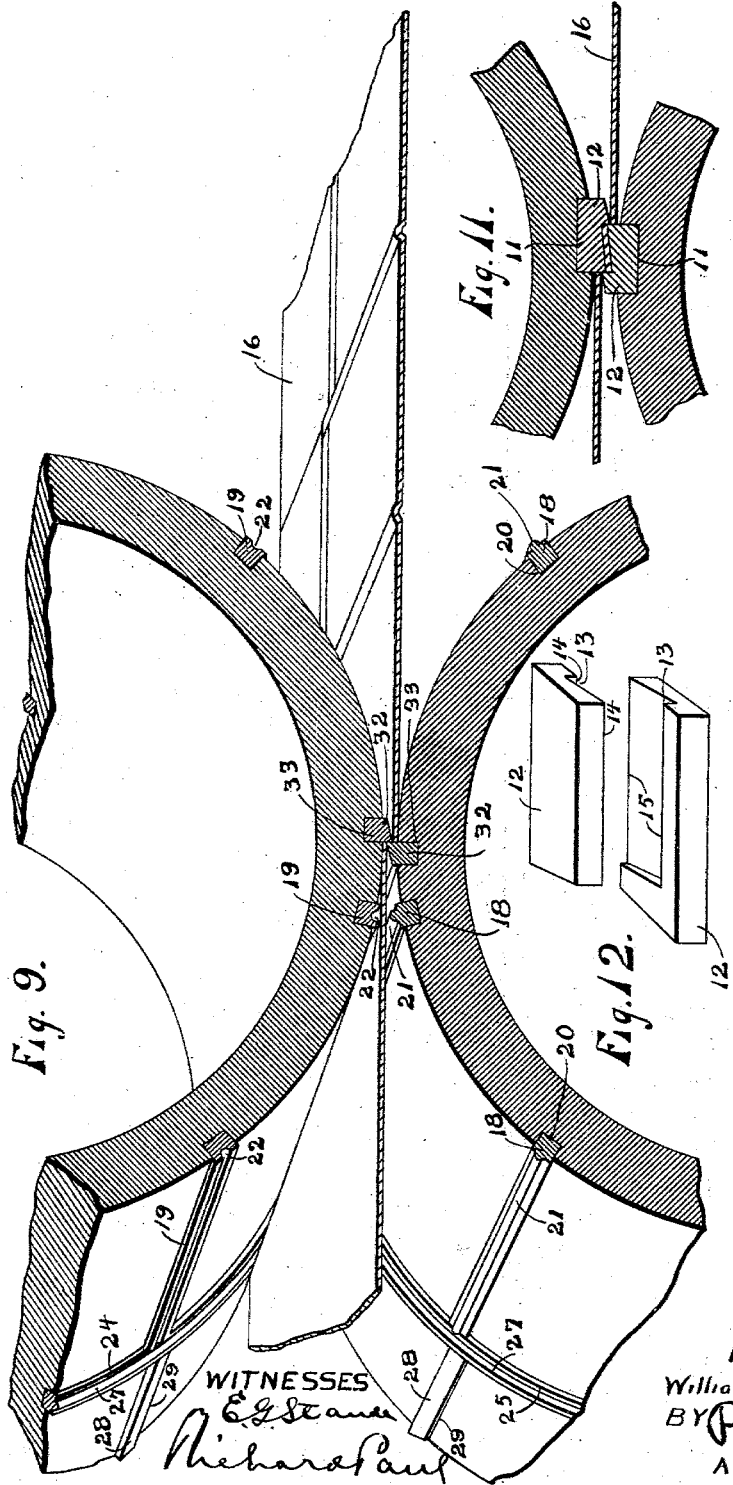
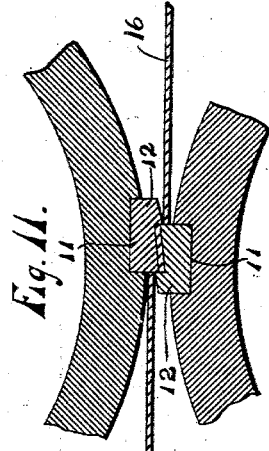
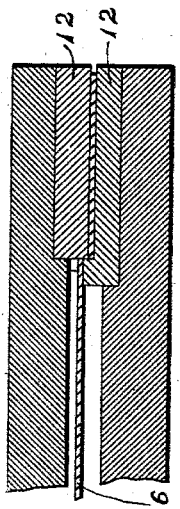
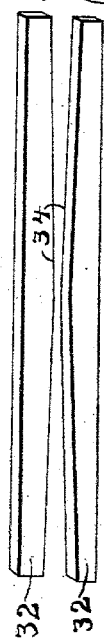
INVENTOR
William B. Browning
BY Paul & Hawley
ATTORNEYS
WITNESSES

UNITED STATES PATENT OFFICE.

WILLIAM B. BROWNING, OF MINNEAPOLIS, MINNESOTA, ASSIGNOR OF ONE-HALF TO FRANK HEYWOOD, OF MINNEAPOLIS, MINNESOTA.

MACHINE FOR CUTTING BLANKS FOR PAPER OR STRAWBOARD BOXES.

SPECIFICATION forming part of Letters Patent No. 694,725, dated March 4, 1902.

Application filed April 27, 1901. Serial No. 57,658. (No model.)

*To all whom it may concern:*

Be it known that I, WILLIAM B. BROWNING, of Minneapolis, Hennepin county, Minnesota, have invented certain new and useful Improvements in Machines for Cutting Blanks for Paper or Strawboard Boxes, of which the following is a specification.

The invention relates to machines for cutting paper-stock, strawboard, &c., into blanks for boxes used in packing cereal food.

The object of the invention is to provide cutting devices which will require but little attention and will turn out the box-blanks rapidly and uniformly.

A further object is to provide means for creasing or scoring the blanks at the points where the bends or turns are made for the corners, to the end that the boxes when completed will present a neater, more finished appearance than boxes of this kind as usually made.

Other objects of the invention will appear from the following detailed description.

The invention consists generally in revolving rolls having coacting knives in their peripheries.

Further, the invention consists in providing creasing or scoring dies in the surfaces of said rolls.

Further, the invention consists in providing means for adjusting the gearing wherefrom the rolls are driven.

Further, the invention consists in various constructions and combinations, all as hereinafter described, and particularly pointed out in the claims.

In the accompanying drawings, forming part of this specification, Figure 1 is a plan view of a cutting-machine embodying my invention. Fig. 2 is a side elevation of the same. Fig. 3 is a longitudinal section. Fig. 4 is a side view showing the gear-adjusting mechanism. Fig. 5 is a longitudinal section showing a portion of the rolls. Fig. 6 is a plan view of the box-blank. Fig. 7 is a sectional view on the line $x$ $x$ of Fig. 6. Fig. 8 is a similar view on the line $y$ $y$ of Fig. 6. Fig. 9 is a detail sectional view in perspective of a portion of the rolls. Figs. 10 and 11 are details of the knives for cutting out the waste pieces at the corners. Figs. 12 and 13 are details of the knives for cutting off the blanks.

In the drawings, 2 represents a suitable frame having standards or legs 3 and upwardly-extending parallel arms 4. I prefer to provide two rolls arranged one above the other, the shaft 5 of the lower roll being journaled in the frame 2 and the shaft of the upper roll being supported in boxes 7, that are vertically slidable between the arms 4. Between the boxes 7 and the frame 2 I arrange heavy coil-springs 8, and above said boxes are set-screws 9, supported in blocks 10 on the upper ends of the arms 4. The upper roll may be adjusted with respect to the lower by means of these set-screws, and down movement of the boxes puts the springs 8 under tension, which upon the release of the boxes from the set-screws will raise the upper roll out of contact with the lower. I have found this a convenient construction in case it is desired to separate the rolls for the purpose of inserting or removing the knives or if for any other reason it is desired to move the upper roll to an inoperative position. The peripheries of these rolls are provided, near the ends of the same, with short longitudinal grooves 11, adapted to receive knives 12, each having a recess 13 and coacting cutting edges 14 and 15. These knives are arranged opposite each other in the peripheries of the rolls, and as the latter revolve the cutting edges of each knife will coact with the cutting edges of the other knife entering the recess therein and removing a short waste strip from the corner of the blank 16. The removal of this strip from the corner leaves a tongue or flap 17 at the end of the blank, to which the paste is applied preparatory to completing the box.

It has been customary heretofore in turning out blanks for paper or pasteboard boxes to cut part way through the stock at the point where the tongue is joined to the blank and also where the blank is bent to form the corners. This method of forming the blanks has been objectionable owing to the difficulty of adjusting the knives to make the proper depth of cut in stock of different weight and also because the blanks would frequently break at the points where they were partially cut through and present a rough unfinished appearance to the corners of the box. To avoid these objections and difficulties to the usual method employed, I have provided a series of male and female creasing or scoring dies 18 and 19. These dies are arranged in longitudinal grooves 20 in the surfaces of the rolls, and the male dies are provided with ribs 21, adapted to enter correspondingly-shaped grooves 22 in the female dies during the revolution of the rolls. I prefer to provide a pair of these dies between the knives 12 and in line with the same, so that when the waste pieces at the corners are cut out by said knives to form the tongue 17 a crease 23 will be simultaneously made in the blank at the point where the tongue 17 is joined thereto. The crease 23 permits folding of the blank to form one of the corners of the box, and at suitable intervals in the peripheral surface of the rolls I provide additional pairs of creasing-dies, so that as the blank advances three other creases will be made therein at the points where the blank is to be folded to form the other corners of the box. These dies occupy positions near the middle of the rolls, and the pairs of dies are suitably spaced according to the size of the boxes for which the blanks are made. At the ends of the longitudinal creasing-dies I provide transversely-arranged male and female dies 24 and 25 at right angles to the dies 18 and 19 and having ribs 26 and grooves 27, corresponding to those heretofore described, except that they are oppositely arranged from those on the longitudinally-arranged dies. This opposite arrangement of the male and female creasing-dies causes the creases 23 to be made in the surface of one side of the blank, while the creases 23', formed by the dies 24 and 25, are in the other side. This is for the purpose of facilitating the folding of the sides and ends of the box. The dies 24 and 25 are so arranged in the peripheries of the rolls that the creases made thereby will be alternately out of line with each other—that is, those that are formed in that portion of the blank that becomes one side of the box will be out of line or offset from those in the adjoining side, but will be in line with the creases in the side second therefrom. Thus the first and third sections of the blank will have horizontal creases that are in line, and also the second and fourth. These creases are made in this way so that when the flaps constituting the ends of the box are folded over one upon the other there will be no binding at the corners, but each flap will turn down evenly and smoothly upon the other and present a neat finished appearance to the ends of the completed box. To cut the blank at the ends of the creases 23 therein, I provide a series of short coacting knives 28, arranged in grooves 29 longitudinally of said rolls and in line with the ribs of the male dies thereon. These knives are provided at each end of the rolls, and their coacting edges serve to cut short slits 23'' in the sides of the blank in as far as the creases formed by the dies 24 and 25. A series of flaps 30 and 31 are thereby formed at the ends, respectively, of those portions of the blank that form the front, back, and sides of the box. When the blank is folded, these flaps are turned down to a horizontal position to form the top and bottom of the box.

I also prefer to provide means for severing the blank from the stock, which consists in arranging knives 32 within grooves 33 in the periphery of the rolls, said knives having cutting edges 34, that are inclined from the center toward the ends thereof, so that the middle portion of the blank will be cut before the edges thereof and any lateral movement of the stock and uneven cutting of the blank prevented. These knives extend across the face of the roll, and their coacting edges sever each blank from the stock of the succeeding one, and while there may be a number of these pairs of knives with each set of rolls I prefer to employ two pairs of rolls of the size described herein, so that each revolution of the rolls will turn out two complete blanks. It has been customary heretofore in cutting paper or pasteboard blanks to employ a single knife, usually arranged in one roll and operating upon the smooth surface of another roll. It has been found, however, that a knife operating in this way will soon become dull and that frequently it does not make a clean cut through the blank, resulting in considerable annoyance and inconvenience after the blank passes out of the machine. I have found, therefore, that by arranging knives in each roll with their edges coacting, corresponding to those of a pair of shears, that the stock would be evenly and completely cut and the knives would remain sharp and in good condition for a long time. Any of the knives or the creases may be readily removed from the rolls at any time for sharpening or other purposes.

The shaft 5 of the lower roll extends out beyond the frame of the machine and is provided with a driving-pulley 35. A disk 36 is secured on said shaft and is provided with holes 37, through which lugs 38, that are arranged on a gear 39, project. The gear 39 is loose on its shaft and may be adjusted and locked in any desired position by means of set-screws 40 and 41, provided in lugs 42 and 43 on said disk 36. A gear 44 on the shaft 6 of the upper roll has its teeth in engagement with the gear 39. By adjusting the gear 36 the knives may be set so that their edges will coact and stand in their proper relative position to make a smooth even cut in the blank.

To feed the stock properly to the rolls, I prefer to provide a long table 45, having one end resting upon a shelf 46 on the frame 2 and its other end supported on legs 47, which are provided with bearings 48 for a spindle 49, that carries the roll of strawboard-stock 50. A guiding-roller 51 is provided in bearings on the under side of the table 45, over which the stock is fed to the rolls. When a roll is nearly exhausted, its outer end will have a tendency to curl up, and I therefore prefer to provide a small roll 52 between the roller 51 and the spindle 49 which will guide the ends of the strawboard and prevent it from curling up away from the table. This table is of any suitable length, but I prefer to make it of such length that the roll or spool of stock will be removed a sufficient distance from the rolls to allow the strip or band of strawboard to adjust itself evenly before it is engaged by the knives and creasers.

To operate the machine, a roll of strawboard is hung on the table and its end inserted between the revolving rolls, the latter having been adjusted so that the end of the strawboard will first be engaged by the double-edged clipping-knives, which will remove a small strip from the corners, leaving a flap or tongue the base of which will be simultaneously creased by the dies arranged between the clipping-knives. The material will next be engaged by the pairs of creasers that are arranged transversely of the rolls. Then the second pair of longitudinally-arranged creasing-dies will be brought into position to form a crease for the second corner, and at the same time the edges of the strawboard will be slit or split to form the flaps for the top and bottom of the box. The operation will then be continued, the transversely-arranged creasing-dies alternating in operation with those that are longitudinally arranged until the four walls of the box have been formed, when the blank will be severed by the knives provided for that purpose. These knives and creasing devices are all in duplicate on the rolls, so that with each revolution two complete box-blanks will be turned out. By increasing the diameter of the rolls provision may be made for delivering a greater number of blanks with each revolution.

The machine has a very large capacity, and the blanks delivered thereby will be completely severed one from the other, and the creases and slits therein will be evenly and uniformly made. The knives and dies are all readily removable from the rolls, and the method of supporting the upper roll upon the coil-springs that are put under tension by the set-screws engaging the boxes of said roll enables the operator to have quick and convenient access to the knives and creasing devices. By providing the blank-severing knives with inclined or tapered cutting edges I have found that less power will be required to force the knives through the paper or strawboard and that the stock and the cutting mechanism will run more evenly and smoothly.

Having thus described my invention, I claim as new and desire to secure by Letters Patent—

1. The combination, of the rolls, with male and female creasing-dies provided longitudinally in their peripheral surfaces, knives 12 provided in the surfaces of said rolls at the ends of said creasing-dies, the opposite knives having coacting cutting edges 14 and 15, for the purpose specified.

2. The combination, of the coacting rolls, with knives 12 arranged in both their peripheral surfaces, the knives of each roll having recesses 13 to receive corresponding knives on the opposite roll and the opposite knives having coacting cutting edges 14 and 15, for the purpose specified.

3. The combination, of the revolving rolls, with the knives 32 arranged longitudinally therein, the knives of each roll having cutting edges coacting with the edges of the corresponding knives in the other roll and said edges being inclined or tapered from the center toward the ends of the knives, for the purpose specified.

4. The combination, of the revolving rolls, with the longitudinally and transversely arranged male and female creasing-dies, the double-edged cutting-knives provided at the corners of said longitudinal dies and adapted to cut out the corners of the blank simultaneously with the formation of the longitudinal and transverse creases therein, knives 28 also provided in the surfaces of said rolls and adapted to slit the edges of the blank, and the blank-severing knives 32 oppositely arranged in said rolls and having coacting cutting edges, substantially as described.

5. The combination, with the revolving rolls, of the male and female creasing-dies arranged transversely thereon, the adjoining pairs of dies being offset or out of line with each other, for the purpose specified.

6. The combination, of revolving rolls, with male and female creasing-dies longitudinally arranged thereon, corresponding dies arranged transversely with respect to the axes of said rolls, the ribs and grooves of said longitudinal and transverse dies being reversely arranged on said rolls whereby the creases formed by them will be in the opposite sides of the blank, substantially as described and for the purpose specified.

In witness whereof I have hereunto set my hand this 17th day of April, 1901.

WILLIAM B. BROWNING.

In presence of—
RICHARD PAUL,
M. C. NOONAN.